(12) United States Patent
Platz et al.

(10) Patent No.: US 10,739,942 B2
(45) Date of Patent: Aug. 11, 2020

(54) USER INTERFACE AND METHOD FOR INTERACTIVELY SELECTING A DISPLAY

(71) Applicant: SIEMENS AKTIENGESELLSCHAFT, München (DE)

(72) Inventors: Axel Platz, München (DE); Sonja Sander, München (DE)

(73) Assignee: Siemens Aktiengesellschaft (DE)

( * ) Notice: Subject to any disclaimer, the term of this patent is extended or adjusted under 35 U.S.C. 154(b) by 57 days.

(21) Appl. No.: 15/276,817

(22) Filed: Sep. 27, 2016

(65) Prior Publication Data

US 2017/0090698 A1    Mar. 30, 2017

(30) Foreign Application Priority Data

Sep. 29, 2015  (DE) .......................... 10 2015 218 740

(51) Int. Cl.
*G06F 3/0482*       (2013.01)
*G06F 3/0485*       (2013.01)
(Continued)

(52) U.S. Cl.
CPC .......... *G06F 3/0482* (2013.01); *G05B 15/02* (2013.01); *G06F 1/1601* (2013.01); *G06F 1/182* (2013.01);
(Continued)

(58) Field of Classification Search
CPC ........ G06F 15/00; G06F 15/02; G06F 1/1601; G06F 1/1615; G06F 1/1616;
(Continued)

(56) References Cited

U.S. PATENT DOCUMENTS 4,490,932 A    1/1985  McIntire
5,046,274 A    9/1991  David
(Continued)

FOREIGN PATENT DOCUMENTS

EP    1983417 A2    10/2008
EP    2363792 A1    9/2011
(Continued)

OTHER PUBLICATIONS

"Cover Flow", https://en.wikipedia.org/wiki/Cover_Flow of Sep. 15, 2015.

*Primary Examiner* — William C Trapanese
(74) *Attorney, Agent, or Firm* — Schmeiser, Olsen & Watts LLP (57) ABSTRACT

A user interface, computer program, computer readable media and method arranges displays on a lateral surface of a cylinder, which displays can be easily viewed and selected by rotation about the axis of rotation of the cylinder. A user operates an input element for this purpose. A drive rotates the lateral surface containing the displays according to the user's inputs. In addition to this exemplary embodiment of a mechanical arrangement, a user interface is also proposed which visualizes the displays and the lateral surface only virtually as graphical objects on a graphical user interface. The rotation of the displays is now output as an animation on the graphical user interface. This affords the advantage that a visualization is provided which images a mental model of the user on the graphical user interface and simultaneously increases the user's attention by means of the animation.

17 Claims, 4 Drawing Sheets

(51) Int. Cl.
*G06F 3/0484* (2013.01)
*G05B 15/02* (2006.01)
*G06F 1/16* (2006.01)
*G06F 1/18* (2006.01)
*G06F 3/0488* (2013.01)
*G06F 3/14* (2006.01)
*G06T 13/80* (2011.01)
*G06T 3/40* (2006.01)
*G06T 3/60* (2006.01)

(52) U.S. Cl.
CPC ........ *G06F 3/0485* (2013.01); *G06F 3/04842* (2013.01); *G06F 3/04845* (2013.01); *G06F 3/04883* (2013.01); *G06F 3/1423* (2013.01); *G06T 13/80* (2013.01); *G06F 2203/04803* (2013.01); *G06T 3/40* (2013.01); *G06T 3/60* (2013.01)

(58) Field of Classification Search
CPC .... G06F 1/1618; G06F 1/1622; G06F 1/1613; G06F 1/1633; G06F 1/1637; G06F 1/1641; G06F 1/1643; G06F 1/1647; G06F 1/1649; G06F 1/1652; G06F 1/166; G06F 3/147; G06F 1/1446; G06F 1/0488; G06F 1/04883; G09F 11/02; G09F 11/025; G09F 11/04; G09F 11/12; G09F 11/10; G09F 11/16; G09F 19/02; G09G 2380/02
See application file for complete search history.

(56) References Cited

U.S. PATENT DOCUMENTS

| | | |
|---|---|---|
| 2006/0082518 A1 | 4/2006 | Ram |
| 2006/0282792 A1 | 12/2006 | Berrill et al. |
| 2007/0063873 A1* | 3/2007 | Murray .................... G09F 7/18 340/932 |
| 2007/0150810 A1* | 6/2007 | Katz ...................... G06F 3/0481 715/229 |
| 2008/0263452 A1 | 10/2008 | Tomkins |
| 2008/0300698 A1* | 12/2008 | Havekost .............. G06F 9/4488 700/83 |
| 2009/0172596 A1 | 7/2009 | Yamashita |
| 2009/0260266 A1 | 10/2009 | Li |
| 2011/0046792 A1* | 2/2011 | Imes ........................ F24F 11/63 700/278 |
| 2012/0224311 A1* | 9/2012 | Sutherland .............. B25J 9/0084 361/679.01 |
| 2012/0265713 A1* | 10/2012 | Kim ........................ G09F 5/00 705/500 |
| 2012/0304130 A1* | 11/2012 | Rueff .................... H04L 43/026 715/850 |
| 2013/0145322 A1 | 6/2013 | Hendricks |
| 2014/0137020 A1* | 5/2014 | Sharma ................. G06F 3/0482 715/769 |
| 2014/0333674 A1* | 11/2014 | Lawson ................ G06F 3/0481 345/684 |
| 2014/0358281 A1* | 12/2014 | Lipton .................... G09F 11/02 700/245 |
| 2015/0177933 A1 | 6/2015 | Cueto |
| 2015/0241926 A1 | 8/2015 | Park et al. |
| 2016/0061797 A1* | 3/2016 | Kocher .............. G01N 33/0011 702/24 |
| 2016/0121195 A1* | 5/2016 | Brown ............... A63B 71/0619 40/544 |

FOREIGN PATENT DOCUMENTS

| | | |
|---|---|---|
| EP | 2447946 A3 | 5/2012 |
| FR | 2959110 A1 | 10/2011 |

\* cited by examiner

USER INTERFACE AND METHOD FOR INTERACTIVELY SELECTING A DISPLAY

CROSS-REFERENCE TO RELATED APPLICATIONS

This application claims priority German Application No. 10 2015 218740.3 having a filing date of Sep. 29, 2015, the entire contents of which are hereby incorporated by reference.

FIELD OF TECHNOLOGY

The following relates to the interactive selection of displays, as are used in control rooms, for example. In this case, the displays each display image information. For example, real-time information, received from sensors in an energy network or in an industrial installation. In this case, the image information may comprise text, numerical or graphical contents representing sensor measurements, for example. The displays can also output tasks for monitoring and maintaining an installation. They may furthermore also contain control elements of a graphical user interface, which control elements can be used to control or regulate processes in the installation. The displays may furthermore also be virtual. In this case, the display is formed by an item of pixel-based or vector-based image information which is static or is updated at discrete intervals of time or continuously.

BACKGROUND

It is known practice to equip a control room with a plurality of displays, for example flat screens, which each output different image information. In this case, the displays are mounted on a user's workstation via holders. More image information is generally available than can be output on the existing displays. In this context, a user interface can allow image information to be changed over from one display to another display or can allow the image information on one display to be replaced with image information which has previously not been output on any of the displays.

Control rooms often have a large screen. In this context, there may be a need to select one of the displays so that its image is output on the large screen. Such a selection can be made, for example, using switches which are uniquely assigned to the displays.

Embodiments of the present invention are intended to provide a user interface and a method for interactively selecting a display, which provide an alternative to the prior art.

SUMMARY

An aspect relates to a user interface having a plurality of displays which are arranged beside one another on a lateral surface of a cylindrical or prismatic carrier element. A control unit is set up to rotate the displays about an axis of rotation, which is an axis of symmetry of the carrier element in particular, on the basis of input signals, as a result of which one of the displays can be positioned in a selection position.

In the method, a control unit rotates a plurality of displays, which are arranged beside one another on a lateral surface of a cylindrical or prismatic carrier element, about an axis of rotation, which is an axis of symmetry of the carrier element in particular, on the basis of input signals, as a result of which one of the displays is positioned in a selection position.

The advantages mentioned below need not necessarily be achieved by the subject matters of the independent patent claims. Rather, these may also be advantages which are achieved only by means of individual embodiments, variants or developments.

The input signals are produced, for example, by an input element which evaluates user inputs for this purpose, for example a computer mouse. A touchscreen which evaluates touch gestures can also be used as the input element.

The displays are fixedly arranged on the lateral surface and are arranged at a fixed distance from one another, for example. In this case, the carrier element as a whole is rotated. However, the displays may also be movably arranged on the lateral surface, as a result of which a distance between the displays can also be flexibly adjusted. For example, the displays can be moved on rails on the lateral surface.

The carrier element has the form of a vertical circular cylinder or a straight prism, for example. In this case, the axis of rotation corresponds to the longitudinal axis or axis of symmetry of the carrier element. The rotation provides the advantage that the attention of a user is increased. As a result, the user interface and the method are also suitable for presentations. Interaction by means of user inputs is intuitive. From the user's point of view, the selection position is in the center of that side of the lateral surface which faces him, for example. Here he can read the content of the display in the selection position particularly well since it is closest to him. The selected display can additionally be output via a large screen or a projector.

According to one embodiment, an input element converts user inputs into the input signals. The carrier element is mounted on a shaft. A drive is meshed with the shaft via a transmission and is controlled by the control unit.

In one development, the displays are LED, OLED or LCD displays.

According to one embodiment, the user interface comprises a screen. The control unit is a processor which is programmed to output the displays as graphical elements of a graphical user interface on the screen, the carrier element, its lateral surface and the displays being virtual. The processor is also programmed to evaluate the input signals and to rotate the displays on the graphical user interface on the basis of the input signals.

In the corresponding embodiment of the method, the control unit is a processor which outputs the displays as graphical elements of a graphical user interface on a screen, the carrier element, its lateral surface and the displays being virtual. The processor also evaluates the input signals and rotates the displays on the graphical user interface on the basis of the input signals.

This rotation is preferably output as an animation on the graphical user interface, which moves the displays along the lateral surface.

This embodiment affords the advantage that a visualization is provided which images a mental model of a user on the graphical user interface and simultaneously increases the user's attention by means of the animation. In this case, the animation which moves the displays along the lateral surface on the graphical user interface on the basis of the input signals assists with the user's understanding of the physical model of the metaphors.

The carrier element is a vertical circular cylinder or a straight prism and therefore provides a simple graphical form, with the behavior of which the user is familiar from the physical world, as a result of which he can easily apply this mental model to the graphical user interface. The displays are oriented to the outside on the lateral surface and enable very good readability.

The carrier element need not be visualized independently of the lateral surface as a graphical element on the graphical user interface. Rather, the carrier element can also merely be a geometrical description which allows the lateral surface and its imaging on the graphical user interface to be calculated. Furthermore, the lateral surface itself also need not be visualized as an independent graphical element since the lateral surface is indirectly represented by the arrangement of the displays. For better illustration, however, the lateral surface and/or the carrier element itself may also be visualized, in addition to the displays, as graphical elements on the graphical user interface.

From the user's point of view, the selection position is in the center of the lateral surface, that is to say centrally in front of the axis of rotation, for example. The display in the selection position is perspectively imaged with the greatest area on the screen on account of its vicinity to the viewer, as a result of which its content can be read particularly well. The selected display can be additionally output in a further region of the graphical user interface or on another screen, a large screen or in an image-filling manner using a projector.

The processor may be a microprocessor or a microcontroller, for example. In order to display and animate the displays, the graphical user interface provides, for instance, a suitable widget or GUI element which, by means of object-oriented programming, provides an object for the lateral surface and respectively provides an object for each of the displays, for example. However, a separate object for the lateral surface and/or the carrier element itself is not absolutely necessary, as explained above.

Although the known art discloses alternatives, for example from the document "Cover Flow", available on the Internet at https://en.wikipedia.org/wiki/Cover_Flow on 09.15.2015, the present embodiment provides the advantage over this alternative that the animation is less confusing for the user. The laterally arranged displays are also displayed with less distortion. Furthermore, the embodiment enables a vertical layout for positioning on the right-hand or left-hand edge of the screen. The displays themselves are not tilted into the center during the animation, as is known, but rather always point to the outside on the lateral surface. For example, the user can click on one of the displays using the mouse, after which this display rolls into the selection position, while the remaining displays subsequently roll on the lateral surface. In this case, the order of the displays is always retained.

In one development, the processor is programmed to output the lateral surface as a graphical element on the graphical user interface. In this case, parts of a rear side of the lateral surface may also be visible. The displays are arranged only on a half of the lateral surface which faces the user. The displays are rotated by moving them on the lateral surface. Displays, which are pushed onto a side of the lateral surface remote from the user by the rotation, are individually moved along the remote side of the lateral surface with a fast sliding movement using an animation, with the result that they appear again on that side of the lateral surface which faces the user. According to this variant, all displays are always displayed again on that side of the lateral surface which faces the user after each rotation, with the result that all displays are always visible. This is advantageous, in particular, for use in control rooms if the displays output safety-critical contents.

This provides the advantage that displays which encircle the rear side of the carrier element as a result of the rotation can be visualized in the background in a hazy manner by means of an animation, as a result of which the user can understand which displays change the side. The animation along the lateral surface on the rear side makes it possible for the user to understand where the displays are situated during interaction. As a result, he can also find them again more easily. Depending on the perspective display, the rear side of the lateral surface may be situated exactly behind the front displays or laterally offset from the latter.

According to one embodiment, the screen is in the form of a touchscreen. The processor is programmed to evaluate a touch gesture on the touchscreen, which touches and/or moves one of the displays or the lateral surface on the touchscreen, as an input signal. The processor is also programmed to rotate the displays on the basis of the touch gesture.

For example, the user can touch one of the displays and can move it into the center, as a result of which the displays are rotated accordingly. Alternatively, the user can tap on one of the laterally displayed displays, whereupon this display and all other displays are rotated in such a manner that the display which has been tapped comes to lie in the selection position, that is to say in the center.

In one development, the displays output one or more of the following items of image information:

documents, image or video files, the video files being output as moving images, in particular, real-time information received from sensors in an energy network or in an industrial installation, text, numerical or graphical contents representing sensor measurements, for example, tasks for monitoring and/or maintaining an energy network or an industrial installation, and/or control elements of the graphical user interface, which control elements can be used to control or regulate processes in an energy network or in an industrial installation.

According to one embodiment, the displays are displayed in a first region of the graphical user interface. A selected display, which is in the selection position, is additionally displayed in a second region of the graphical user interface, the selected display being displayed in the second region in an enlarged form, in particular.

This makes it possible to clone the selected display into a main region of the graphical user interface. On account of the larger area of the main region, sensor measurements, text etc. can be better read from the selected display. Furthermore, control elements contained in the selected display can be operated in the main region of the graphical user interface.

In one development, the displays are arranged horizontally beside one another on the lateral surface, the axis of rotation being vertically oriented. Alternatively, the displays are arranged vertically above one another on the lateral surface, the axis of rotation being horizontally oriented. The stated directions of horizontal and vertical refer in this case to the two Cartesian coordinate axes which span the graphical user interface.

According to this development, the axis of rotation can run both vertically and horizontally on the graphical user interface. In the second case, the graphical user interface acts like the date display of a wristwatch.

The computer-readable data storage medium stores a computer program which carries out the method when it is executed in the processor. The computer program carries out the method while it is processed in the processor.

BRIEF DESCRIPTION

Some of the embodiments will be described in detail, with reference to the following figures, wherein like designations denote like members, wherein.

Figure 1:
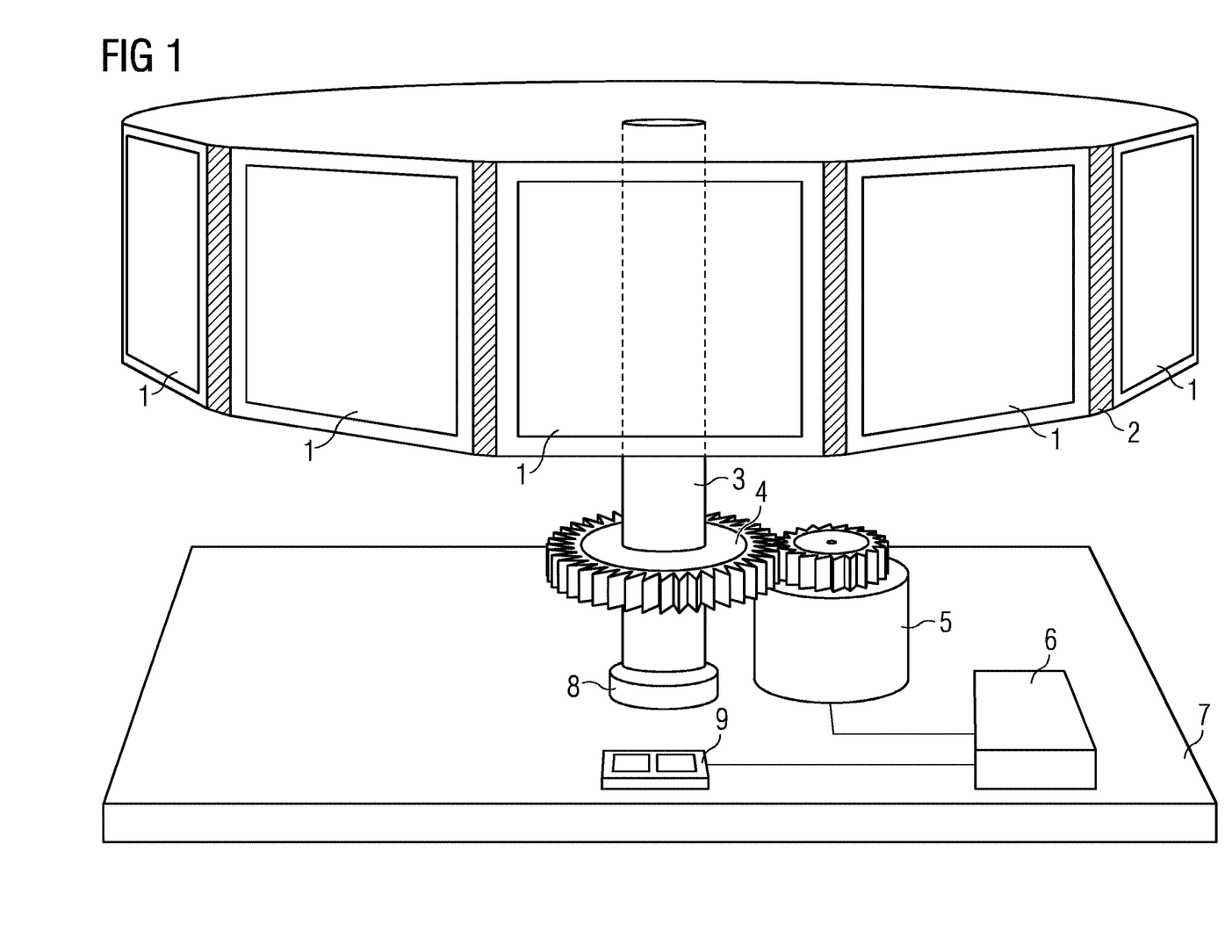
FIG. 1 shows an exemplary embodiment of a user interface for interactively selecting displays 1.

FIG. 1 shows a cylindrical carrier element having a lateral surface 2 on which displays 1, for example flat screens, are mounted all around and in a manner pointing to the outside. Insofar as the displays 1 have a flat surface, the design of the carrier element can also be referred to as a straight prism.

The carrier element is mounted on a shaft 3 which is vertically oriented and is mounted on a bearing 8. The shaft 3 is meshed with a drive 5 via a transmission 4. The drive 5 can be used to rotate the carrier element containing the displays 1 about an axis of rotation which is predefined by the shaft 3. For this purpose, the drive 5 is controlled by a control unit 6, for example an electrical circuit or a programmable logic controller, which evaluates input signals from an input element 9. The bearing 8, the input element 9, the drive 5 and the control unit 6 are mounted on a base plate 7.

The input element 9 has two pushbuttons, for example. A left-hand pushbutton produces an input signal which is converted by the control unit 6 into a rotation of the carrier element in the anticlockwise direction. A right-hand pushbutton of the input element 9 produces an input signal which is converted by the control unit 6 into a rotation of the carrier element in the clockwise direction. In this manner, a user can intuitively move the displays 1 in the desired direction in order to bring a desired display into a selection position in the foreground. In this case, the selection position is the central position facing the user; that is to say, in FIG. 1, the position of the central display 1 of the five displays 1 are depicted.

Figure 2:
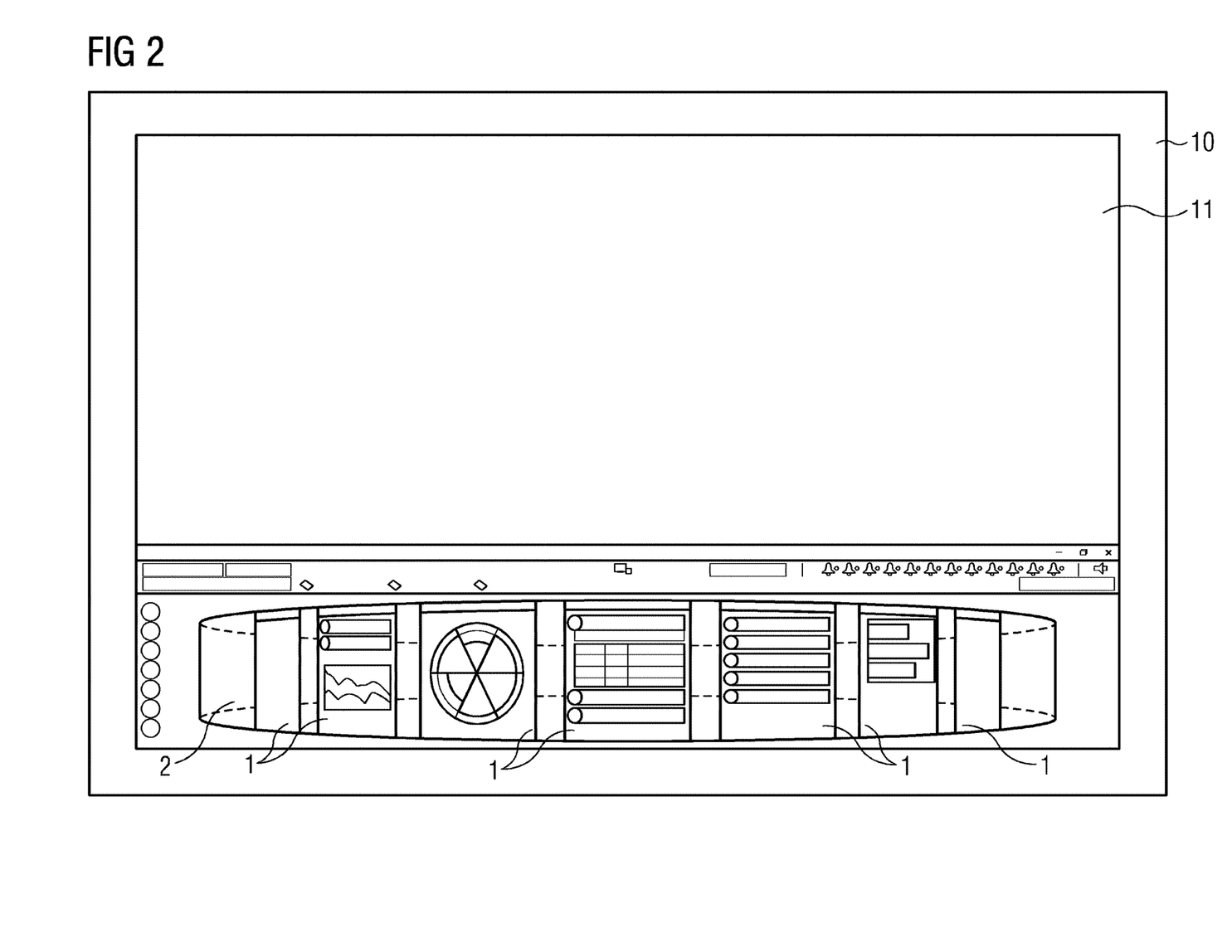
FIG. 2 shows a first exemplary embodiment of a graphical user interface 11 for interactively selecting displays 1.

FIG. 2 shows a graphical user interface 11 which is displayed on a screen 10, for example an LED or LCD screen or a large screen. In this case, the lateral surface 2 of the carrier element is purely virtual, that is to say the lateral surface 2 is displayed on the graphical user interface 11 only as a graphical element. The same applies to the displays 1 which can output static or dynamic documents, image or video files. The lateral surface 2 and the displays 1 are programmed as objects of the graphical user interface 11, for example, for this purpose. As can be seen in FIG. 2, the lateral surface 2 may also be visible in the background between the displays 1, as a result of which a user gains a visual impression of the entire lateral surface 2 both in the foreground and in the background. This assists with the visual metaphor of a cylindrical carrier element.

The displays 1 are arranged horizontally beside one another only on a half of the lateral surface 2 facing the user. They are rotated about a vertical axis of rotation, which is geometrically the axis of rotation of the lateral surface 2, by means of horizontal movement on the lateral surface 2. Displays 1 which are pushed onto a side of the lateral surface 2 remote from the user by the rotation are individually moved along the remote side of the lateral surface 2 with a fast sliding movement by means of an animation, with the result that they appear again on that side of the lateral surface 2 which faces the user. According to this variant, all displays 1 are always displayed again on that side of the lateral surface 2 which faces the user after each rotation, with the result that all displays 1 are always visible after each rotation.

For example, the user can click on one of the displays 1 using the mouse or can tap it using his finger in the case of a touchscreen, after which the corresponding display 1 is rotated, together with the other displays 1, about the axis of rotation, that is to say is moved along the lateral surface 2, in such a manner that it comes to lie in the center. The central position is a selection position in this case. This makes it possible for the user to navigate very quickly and intuitively on the graphical user interface 11.

The displays 1 and the lateral surface 2 are perspectively displayed on the screen 10. The graphical user interface 11 is programmed in an object-oriented manner, for example. An operating system which outputs the graphical user interface 11 on the screen 10 using a graphics card contains program code which manages the displays 1 and the lateral surface 2 as graphical objects. In this case, the graphical objects are described as objects in a three-dimensional space and are projected onto the two-dimensional graphical user interface 11 by means of perspective imaging. This produces a three-dimensional impression for the user. Modern graphics cards support this by means of the OpenGL programming interface, for example.

In principle, the screen 10 may also be a 3-D screen which outputs a 3-D image as the graphical user interface 11. In this case, the graphical objects may be output in such a manner that they produce an actually three-dimensional visual impression.

The displays 1 can output documents, image or video files, for example. They may also visualize real-time information received from sensors in an energy network or in an industrial installation. The displays 1 may display their contents as text, in a numerical and/or graphical manner. The displays 1 may also display tasks for monitoring and/or maintaining an energy network or an industrial installation as contents. They may furthermore also contain control elements of the graphical user interface 11, which control elements, can preferably be used to control or regulate processes in an energy network or in an industrial installation. The control elements may optionally be able to be directly operated in the displays 1. Buttons, checkboxes, drop-down menus, editable text fields, sliders etc., for example, which are displayed inside the respective display 1, are suitable as control elements.

The respectively selected display 1, that is to say the display 1 respectively positioned in the selection position or central position, can be additionally displayed in a second region of the graphical user interface, the selected display preferably being displayed in the second region in an enlarged form. This makes it possible to clone the selected display 1 into a main region of the graphical user interface 11, onto a second screen or onto a large screen. On account of the larger area of the main region, sensor measurements, text etc. can be better read from the selected display. Furthermore, control elements contained in the selected display can be operated in the main region of the graphical user interface 11.

Depending on the proportion of the carrier element and the displays 1, it is possible to arrange 5, 10 or 20 displays 1 on that side of the lateral surface 2 which faces the user, for example. A portrait or landscape format of the displays 1 can be suitably selected for this purpose.

FIG. 3 again shows a graphical user interface 11 on a screen 10, in which the lateral surface 2 containing the displays 1 circumscribes a carrier element which is not shown in any more detail and is also not required on the programming side and the axis of rotation of which runs in the horizontal direction. This means that the displays 1 are rotated here by moving them vertically along the lateral surface 2. This visual metaphor is reminiscent of a date display of a wristwatch and can be arranged in a very space-saving manner on the graphical user interface 11 on the left-hand or right-hand edge of the screen 10.

Figure 3:
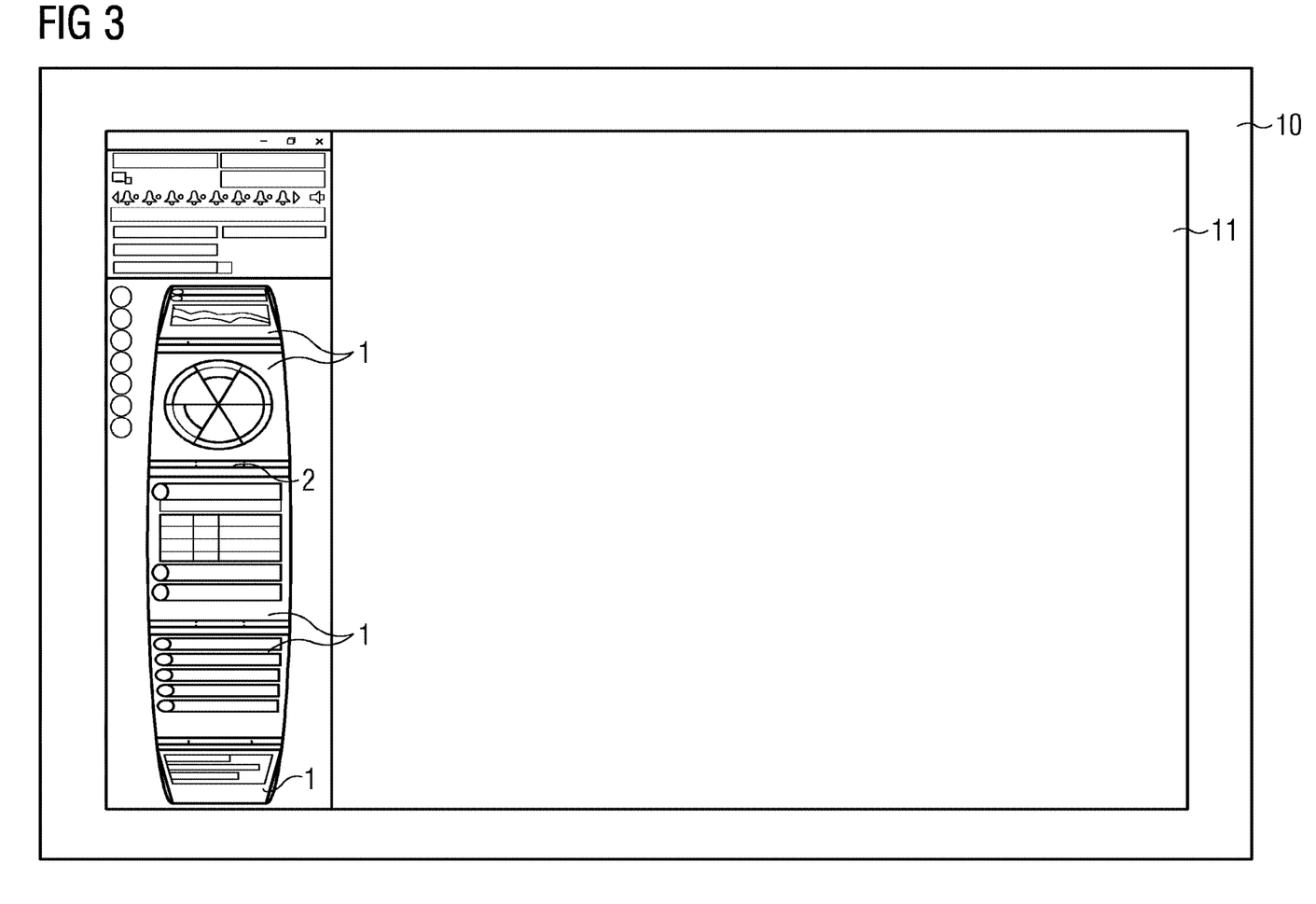
FIG. 3 shows a second exemplary embodiment of a graphical user interface 11 for interactively selecting displays 1.
Figure 4:
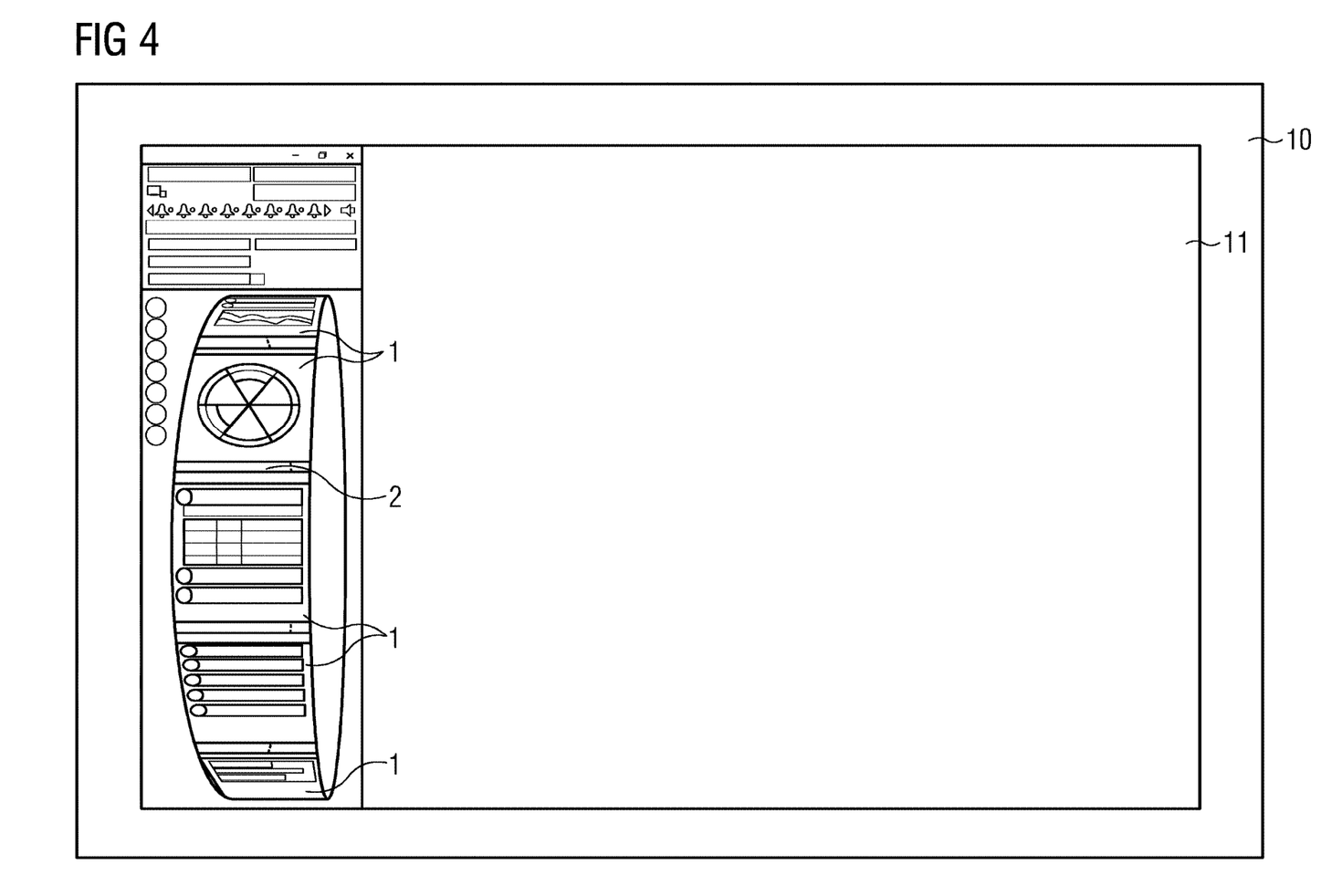
FIG. 4 shows a third exemplary embodiment of a graphical user interface 11 for interactively selecting displays 1.

FIG. 4 shows the graphical user interface 11 from FIG. 3, but the lateral surface 2 is displayed from a somewhat different perspective on the screen 10, as a result of which the visual metaphor can be perceived even more easily by the user since large parts of the rear side of the lateral surface 2 are now also visible on the graphical user interface 11. This enables particularly intuitive animation and interaction for the user.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A user interface for interactively selecting a display comprising:
   a screen;
   a plurality of virtual displays which are arranged beside one another on a lateral surface of a cylindrical or prismatic virtual carrier element, wherein the virtual displays are part of a graphical user interface to output a representation of dynamic processes in an energy network or in an industrial installation in which more than one of the plurality of virtual displays are set up to output one or more items related to an energy network or an industrial installation in real-time;
   a control unit, wherein the control unit includes a processor set up to rotate the virtual displays about an axis of rotation, which is an axis of symmetry of the virtual carrier element, based on input signals evaluated by the processor, as a result of which one of the virtual displays can be positioned in a selection position;
   control elements of the graphical user interface displayed on the screen on and/or proximate to the virtual displays, which control elements can be used to control or regulate the dynamic processes in the energy network or in the industrial installation; and
   wherein the processor is programmed to output the virtual displays as a graphical element of the graphical user interface on the screen such that the three-dimensional shape of the virtual carrier element can be perceived based on the arrangement of the virtual displays on the screen and the real-time outputs of several of the plurality of virtual displays can be seen on the screen.

2. The user interface as claimed in claim 1, in which the screen is and LED, OLED or LCD display.

3. The user interface as claimed in claim 1, wherein the processor is programmed
   to output the virtual displays as the graphical elements of the graphical user interface on the screen, the virtual carrier element, its lateral surface, wherein parts of a rear side of the lateral surface are visible,
   to evaluate the input signals, and
   to rotate the virtual displays on the graphical user interface on the basis of the input signals.

4. The user interface as claimed in claim 3, in which the processor is programmed
   to output the lateral surface as a graphical element on the graphical user interface,
   to arrange the virtual displays only on a half of the lateral surface which faces a user,
   to rotate the virtual displays by moving them on the lateral surface,
   to output an animation which moves virtual displays, which are pushed onto a side of the lateral surface remote from the user by the rotation, individually along the remote side of the lateral surface with a fast sliding movement, with the result that they appear again on that side of the lateral surface which faces the user, as a result of which all virtual displays are always visible again on that side of the lateral surface which faces the user after each rotation.

5. The user interface as claimed in claim 3, in which the screen is in the form of a touchscreen, and in which the processor is programmed
   to evaluate a touch gesture on the touchscreen, which at least one of touches and moves one of the virtual displays or the lateral surface on the touchscreen, as an input signal, and
   to rotate the virtual displays on the basis of the touch gesture.

6. The user interface as claimed in claim 1, in which the virtual displays are set up to output one or more of the following items of image information:
documents, image or video files, the video files being output as moving images,
real-time information received from sensors in an energy network or in an industrial installation, and
text, numerical or graphical contents representing sensor measurements, and
tasks for at least one of monitoring and maintaining an energy network or an industrial installation.

7. The user interface as claimed in claim 3, in which the processor is programmed
   to output the virtual displays in a first region of the screen of the graphical user interface,
   to additionally output a selected virtual display, which is in the selection position, in a second region of the screen of the graphical user interface, the selected virtual display being displayed in the second region in an enlarged form.

8. The user interface as claimed in claim 3, in which the processor is programmed
   to output the virtual displays horizontally beside one another on the lateral surface, the axis of rotation being vertically oriented, or
   to output the virtual displays vertically above one another on the lateral surface, the axis of rotation being horizontally oriented.

9. A method for interactively selecting a virtual display, the method comprising:
providing a graphical user interface having a screen;
providing a plurality of virtual displays in which more than one of the plurality of virtual displays output one or more items related to an energy network or an industrial installation in real-time;
providing a control unit having a processor;
wherein the control unit rotating the plurality of virtual displays, which are arranged beside one another on a lateral surface of a cylindrical or prismatic virtual carrier element, about an axis of rotation, which is an axis of symmetry of the virtual carrier element, on the basis of input signals, as a result of which one of the virtual displays is positioned in a selection position,
wherein the processor is programmed to output the virtual displays as a graphical element of the graphical user interface on the screen such that the three-dimensional shape of the carrier element can be perceived based on the arrangement of the virtual displays on the screen and the output of more than one of the virtual displays can be viewed on the screen;
providing control elements of a graphical user interface displayed on the screen on and/or proximate to the virtual displays, which control elements can be used to control or regulate dynamic processes in an energy network or in an industrial installation, and
controlling or regulating dynamic processes in an energy network or in an industrial installation with the control elements and based on the outputs of the virtual displays.

10. The method as claimed in claim 9,
wherein the processor
outputs the virtual displays as graphical elements of the graphical user interface on the screen, the virtual carrier element,
evaluates the input signals, and
rotates the virtual displays on the graphical user interface on the basis of the input signals.

11. The method as claimed in claim 10,
in which the processor
outputs the lateral surface as a graphical element on the graphical user interface, parts of a rear side of the lateral surface also being visible,
arranges the virtual displays only on a half of the lateral surface facing a user,
rotates the virtual displays by moving them on the lateral surface,
outputs an animation which moves virtual displays, which are pushed onto a side of the lateral surface facing away from the user by the rotation, individually along the remote side of lateral surface with a fast sliding movement, with the result that they appear again on that side of the lateral surface which faces the user, as a result of which all virtual displays are always visible again on that side of lateral surface which faces the user after each rotation.

12. The method as claimed in claim 10,
in which the screen is a touchscreen, and
in which the processor
evaluates a touch gesture on the touchscreen, which at least one of touches and moves one of the virtual displays or the lateral surface on the touchscreen, as an input signal, and
rotates the virtual displays on the basis of the touch gesture.

13. The method as claimed in claim 10,
in which the virtual displays output one or more of the following items of image information:
documents, image or video files, the video files being output as moving images, in particular,
real-time information received from sensors in an energy network or in an industrial installation,
text, numerical or graphical contents representing sensor measurements, and
tasks for at least one of monitoring and maintaining an energy network or an industrial installation.

14. The method as claimed in claim 10,
in which the virtual displays are displayed in a first region of the screen of the graphical user interface, and
in which a selected virtual display, which is in the selection position, is additionally displayed in a second region of the screen of the graphical user interface, the selected virtual display being displayed in the second region in an enlarged form.

15. The method as claimed in claim 10,
in which the virtual displays are arranged horizontally beside one another on the lateral surface, the axis of rotation being vertically oriented, or
in which the virtual displays are arranged vertically above one another on the lateral surface, the axis of rotation being horizontally oriented.

16. A non-transitory computer-readable data storage medium,
which stores executable instructions comprising a computer readable hardware storage device having computer readable program code stored therein, the program code executable by a processor of a computer system adapted to perform the method as claimed in claim 10 when it is executed in the processor.

17. A computer program product comprising:
a non-transitory computer readable hardware storage device, and a computer readable program code stored in the non-transitory computer readable hardware storage device, the program code containing executable instructions executable by a processor of a computer system adapted to perform the method as claimed in claim 10 while it is executed in the processor.

* * * * *